United States Patent [19]

Kikuchi

[11] Patent Number: 4,673,822

[45] Date of Patent: Jun. 16, 1987

[54] WIND ELECTRIC GENERATOR

[76] Inventor: Naomi Kikuchi, 206 Kamiyachi, Niigata 951, Japan

[21] Appl. No.: 788,462

[22] Filed: Oct. 17, 1985

[51] Int. Cl.[4] ............................................. F03D 7/02
[52] U.S. Cl. ....................................... 290/44; 290/55; 416/43; 416/132 B; 416/135; 416/240
[58] Field of Search ....................... 290/44, 55; 416/31, 416/37, 38, 43, 131, 132 B, 223 R, 225, 240, 135-140

[56] References Cited

U.S. PATENT DOCUMENTS

| 797,197 | 8/1905 | Gran | 416/137 |
| 2,050,142 | 8/1936 | White | 416/135 A |
| 2,974,731 | 3/1961 | Mader | 416/136 |
| 4,496,848 | 1/1985 | Binder | 416/140 R |
| 4,517,467 | 5/1985 | Führing | 290/44 |

FOREIGN PATENT DOCUMENTS 54272 9/1948 France ........................... 416/139 A Primary Examiner—Peter S. Wong
Assistant Examiner—Emanuel Todd Voeltz

[57] ABSTRACT

Wind mill blades are mounted on spokes provided on a power shaft via springs, and thereby in an ordinary wind velocity the wind mill blades are adjusted into a prescribed angle, while in a storm they are made parallel to the direction of a wind, thus enabling the wind mill blades, etc., to be prevented from being damaged and the wind mill blades to be large-sized.

4 Claims, 9 Drawing Figures

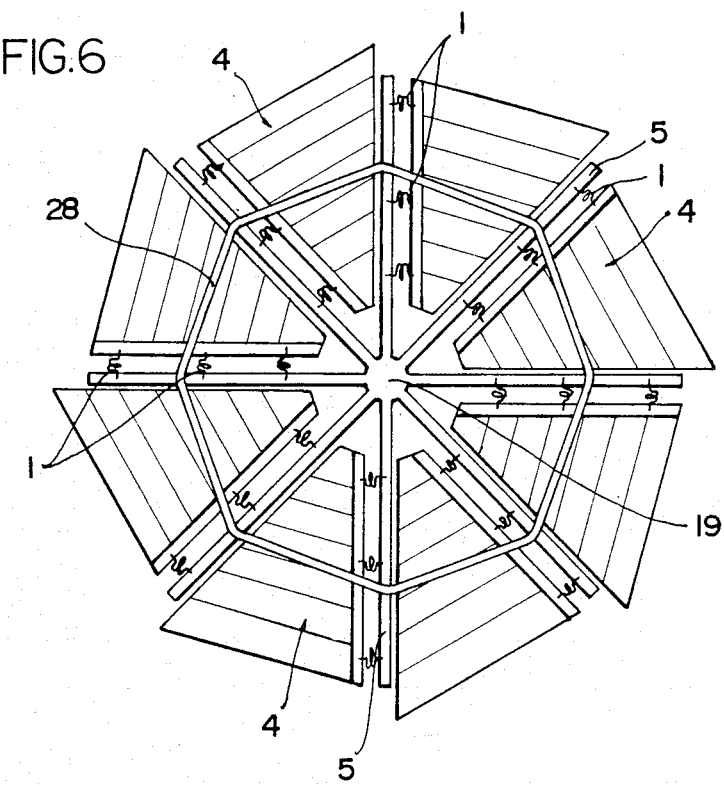

WIND ELECTRIC GENERATOR

BACKGROUND OF THE INVENTION

1. Field of the Invention

The present invention relates to a wind electric generator for converting kinetic energy of air appearing as a wind by a rotor blade wheel having a plurality of wind mill blades radially disposed to rotational energy, and further converting the rotational energy to electric energy by an electric generator.

2. Description of the Prior Art

In a rotary blade wheel, it is needed to control rotational frequency thereof and maintain public security since it is severe in strength as the rotational frequency becomes excessive due to a windstorm.

For example, U.S. Pat. No. 855,912 discloses a rotor blade wheel for a wind electric generator, wherein a plurality of radial spokes are mounted, with a fixture, on a rotor hub attached to a power shaft, and wind mill blades are fixedly mounted on flange parts of the spokes. However, it is feared for such a rotor blade wheel incorporating a fixed pitch system therein, since a steel tower for supporting the rotor blade wheel as well as the wind mill blades may be damaged due to strong torque applied to the wind mill blades during a windstorm.

SUMMARY OF THE INVENTION

In view of the drawback with the prior wind electric generator, it is an object of the present invention to provide a wind electric generator having a pitch adjusting mechanism for the wind mill blades and being extendable to a large-sized one.

The above and other objects, features and advantages of the present invention will become more apparent from the following description when taken in conjunction with the accompanying drawings in which a preferred embodiment of the present invention is shown by way of illustrative example, and like reference numerals designate like parts.

BRIEF DESCRIPTION OF THE DRAWINGS

FIG. 6 is a front view illustrating a third embodiment of a rotor blade wheel.

DESCRIPTION OF THE PREFERRED EMBODIMENT

Figure 1:
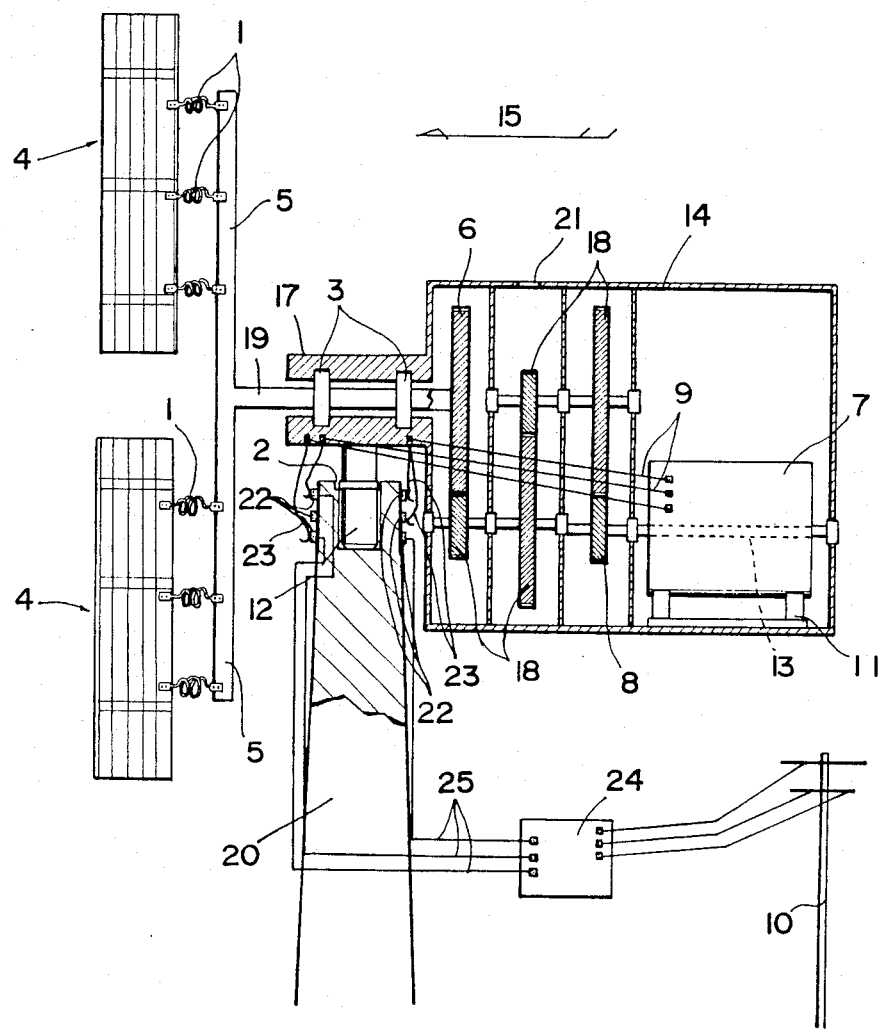
FIG. 1 is general view in a longitudinal section illustrating a first embodiment of a rotor blade wheel according to the present invention.
Figure 2:
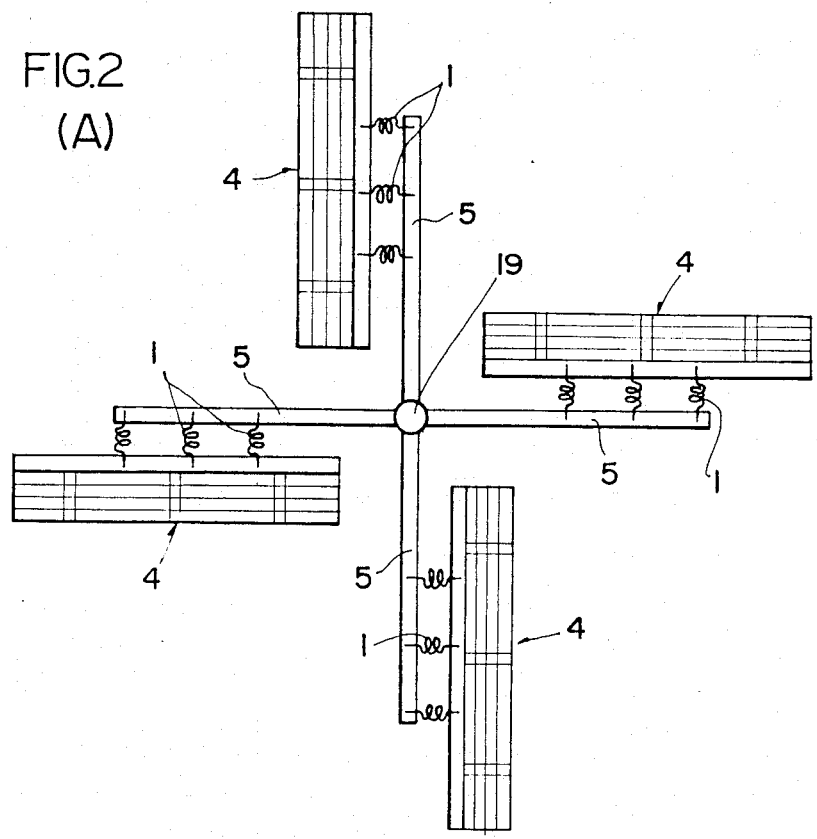
FIG. 2(A) is a front view illustrating the same rotor blade wheel.
FIG. 2(B) is a front view of a portion of the same rotor blade wheel.
Figure 2:
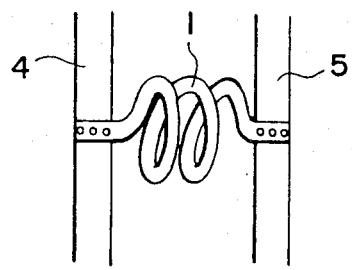
Figure 3:
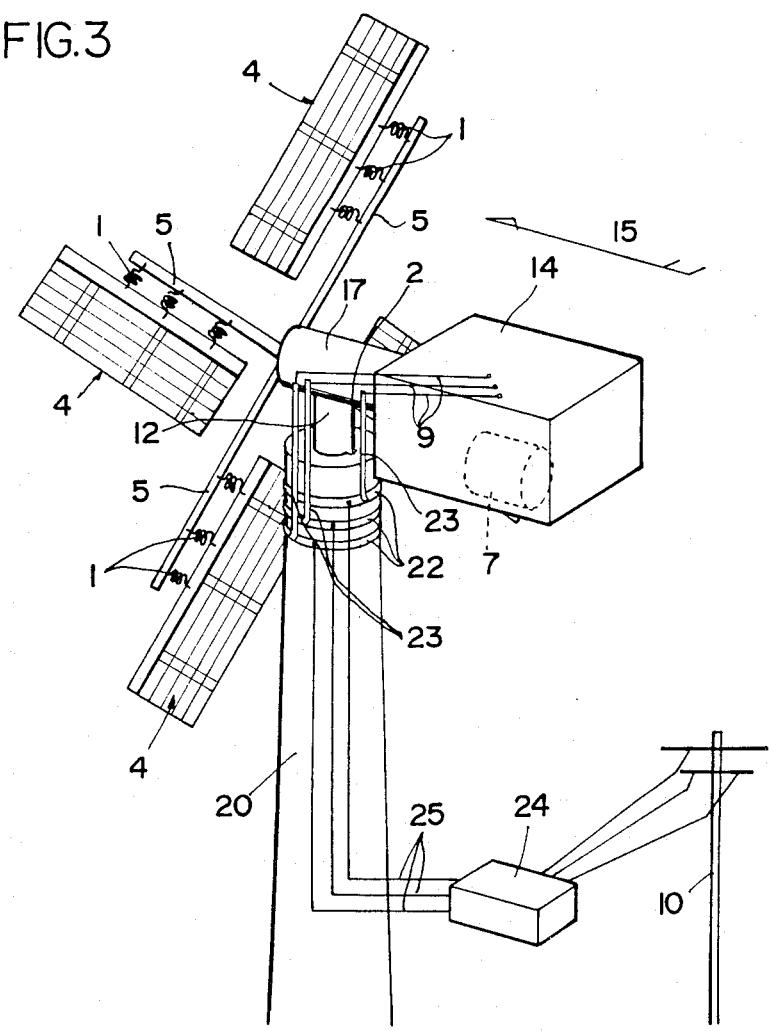
FIG. 3 is a perspective view of a whole of the same rotor blade wheel.
Figure 4:
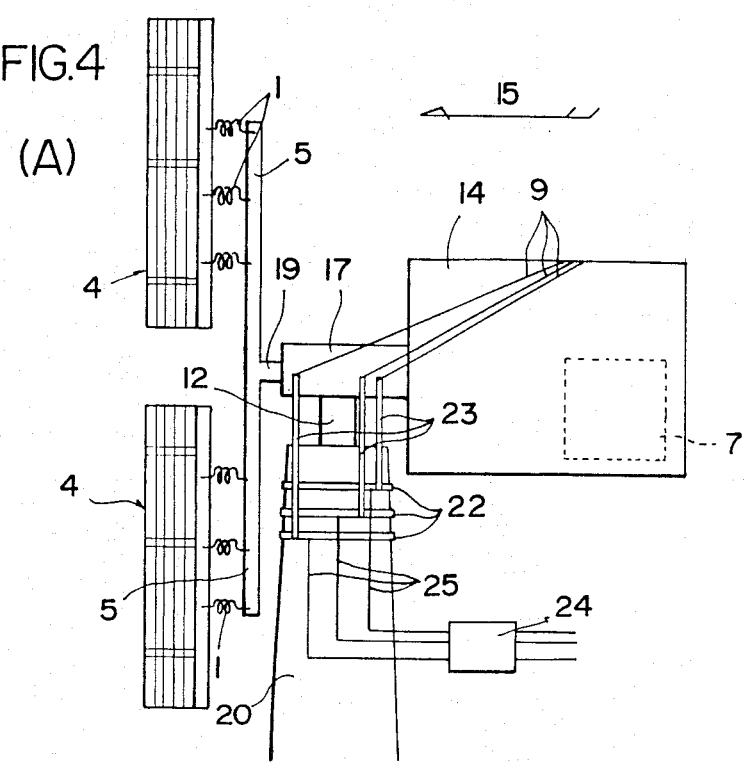
FIG. 4(A) is a side elevational view illustrating a power transmission structure of the same rotor blade wheel.
FIG. 4(B) is a front view illustrating the same power transmission structure.
Figure 4:
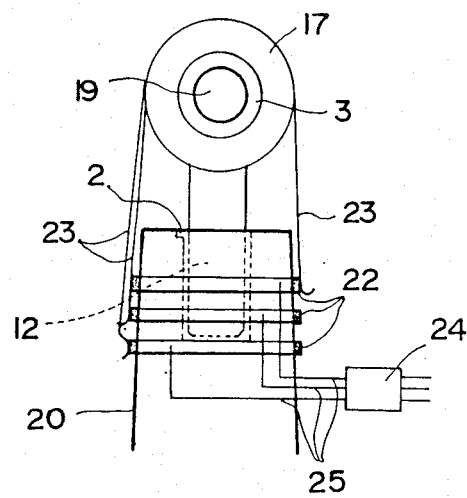

As shown in FIGS. 1 to 4, a rotor blade wheel of a first embodiment according to the present invention has a plurality of spokes (5) disposed radially on the tip of a power shaft (19) supported on bearings (3) and rectangular wind mill blades (4) coupled with the spokes (5) via springs (1). The three springs (1) are provided for a set of the wind mill blades (4) and the spokes (5). The wind mill blades (4) are mounted inclined backward with respect to an axial direction of the power shaft (19).

A power gear (6) is fixedly mounted on an end part of the power shaft (19), an intermediate gear (18) supported by the bearing is engaged with the power gear (6). A driven gear (8) fixed on a main shaft (13) of the electric generator (7) is engaged with the intermediate gear (18). The power gear (6), intermediate gear (18), and driven gear (8) are all contained in a gear case (14) having a gear oil injection inlet (21) therein. The electric generator (7) is mounted on an electric generator base (11) provided integrally with the gear case (14).

The bearing (3) is provided in a bearing case (17), and a supporting rotary shaft (12) is hung on the lower part of the bearing case (17). The supporting rotary shaft (12) is mounted to be horizontally rotatable on the upper end of a wind mill column (20) such as a steel tower, a concrete column and the like, and an oil injection inlet (2) is provided in the rotary shaft part.

Band-shaped commutators (22) are provided on the upper part side surface of the wind mill column (20), and brushes (23) are slidably provided in contact with these commutators (22), and further power transmission lines (9) from the electric generator (7) are connected with these brushes (23). In addition, ends of the transmission lines (25) are connected with a battery (24) or a substation to transmit power to power consuming areas such as home appliances via transmission lines laid on utility poles (10).

Accordingly, when an ordinary wind blows from a direction of an arrow (15) shown in the figure, the wind mill blades (4) held by the springs (1) and kept inclined in the arrow (15) direction absorb energy of the wind to convert it to rotational energy. The rotational energy is transmitted to the main shaft (13) via the power shaft (19), the power gear (6), intermediate gear (18), and driven gear (8) while increased and decreased in their rotations, and converted to electrical energy by the electric generator (7). An electricity so generated is sent to the battery (24) and the like via the transmission lines (9), commutators (22), brushes (23), and transmission lines (25).

Since wind pressure is high in a storm, the wind mill wheel (4) is automatically adjusted to an angle substantially parallel to the arrow (15) direction resisting the resilient force of the springs (1). Accordingly, no strong wind pressure is applied to the wind mill blades (4), eliminating the possibility of their damage.

When the direction of the wind changes, the bearing case (17) and the wind mill column (20) are automatically adjusted such that the former is directed toward the wind at all times by the wind mill blades (4) around the supporting rotary shaft (12) and the wind mill blades (4) directed down the wind.

Consequently, the wind mill blades (4) can be set to a prescribed angle by the springs (1) in a ordinary wind velocity to convert wind energy to rotational energy, while in a storm, the wind mill blades (4) can be adjusted to be substantially parallel to the wind direction by elongation of the springs (1), subject to strong wind pressure. In addition, in an ordinary wind velocity the wind mill blades (4) can be set to an inclination angle suited for the wind velocity, enabling energy conversion efficiency to be increased. It is also possible to employ large-sized wind mill blades (4).

Figure 5:
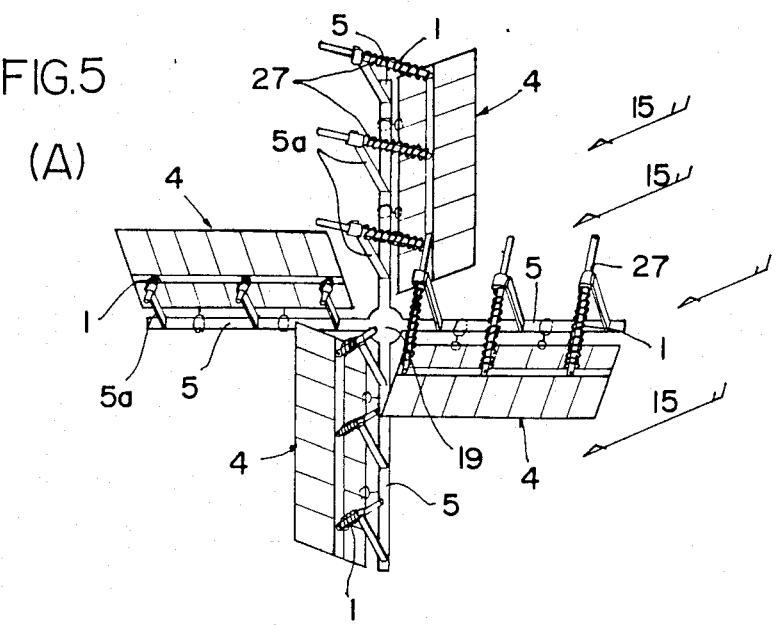
FIG. 5(A) is a perspective view of a whole of a second embodiment of a rotor blade wheel.
FIG. 5(B) is a plan view illustrating the whole of FIG. 5(A)
Figure 5:
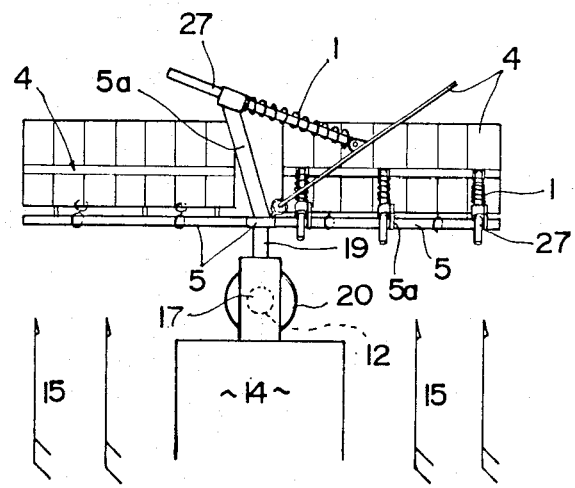

FIG. 5 illustrates the second embodiment of a wind electric generator according to the present invention, in which the same numerals shall be applied to parts providing the same functions as the first embodiment, and detailed description thereof will be omitted.

A pluarity of spokes (5) are radially provided on the power shaft (19). Mounting spokes (5a) are provided on the back sides of the spokes (5) or down the wind in a prescribed interval. The springs (1) connected to the tips of the mounting spokes (5a), while the other ends of the springs (1) are connected to the wind mill blades (4), allowing the wind mill blades (4) to be mounted at a prescribed inclination angle. A shock absorber (27) is provided through a central portion of the spring (1). The shock absorber (27) is a cylindrical telescopic type, which comprises a hydraulic cylinder and a rod in which a piston slidable in the cylinder is assembled. The hydraulic cylinder is connected to the mounting spokes (5a) and the rod connected to the wind mill blades (4).

Accordingly, in an ordinary wind velocity, the wind mill blades (4) can keep a prescribed inclination angle via the springs (1), and convert wind energy to rotational energy, while in a storm, the wind mill blades (4) can be automatically adjusted to be parallel to the direction of a wind, i.e., in the arrow (15) direction due to compression of the springs (1). In addition, the springs (1) and the shock absorbers (27) are combined to exert damping effect, and therby a sudden angle change of the wind mill blades (4) can be prevented.

FIG. 6 illustrates the third embodiment of a wind electric generator according to the present invention, in which detailed description will be omitted for parts having the same functions as those in the first embodiment.

Eight spokes (5) are radially provided on the power shaft (19), while reinforcing lever (28) is connected with central portions of these spokes (5), and triangle-shaped wind mill blades (4) are connected to the the spokes (5) with use of the springs (1). Accordingly, the wind mill blades (4) can be arranged to be parallel to the wind direction, preventing damage. In addition, the wind mill blades can be large-sized.

With the arrangement of the triangle-shaped wind mill blades (4) provided at eight portions in such a way, an effective area per unit wind can be increased.

Further, the number of the wind mill blades (4) is not limited to 4 or 8, since any number other than that number will do. The number of the springs (1) is not limited to 3, and springs different in strength and in the numbers of windings can be utilized. In addition, a reinforcing lever for connecting wind mill blades freely in their inclinations may be provided. The number of stages of the intermediate gears and the tooth number thereof can be increased.

Although certain preferred embodiments have been shown and described, it should be understood that many changes and modifications may be made therein without departing from the scope of the appended claims.

What is claimed is:

1. A power electric generator comprising:
   (a) a power shaft having a horizontal axis of rotation and a support column, said power shaft rotatably coupled to said support column for free rotation about a vertical axis;
   (b) a plurality of spokes radially extending from said power shaft;
   (c) a plurality of springs having first and second ends, with first ends connected to said spokes;
   (d) a plurality of wind mill blades, each blade spaced apart from said spokes by at least one spring, said springs having said second ends supporting said blades and biasing said blades in a first extreme position facing typical air currents for rotation of said power shaft about said horizontal axis and about said vertical axis to align said power shaft parallel the direction of the air current, said springs providing a force such that storm type air currents move said wind mill blades to a second extreme position parallel to said storm type air currents,
   said power shaft rotation about the horizontal axis causing rotation of a main shaft of an electric generator.

2. A power electric generator according to claim 1, wherein a shock absorber is provided through each spring, each shock absorber having a first end and a second end, said first ends each communicating with a blade and said second ends each communicating with a spoke.

3. A wind electric generator comprising,
   (a) an electric generator;
   (b) a power shaft rotatably coupled to said electric generator to transfer rotational motion to the generator, said power shaft rotatable about a horizontal axis;
   (c) a support column, said power shaft rotatably coupled to said suport column for rotation about a vertical axis;
   (d) a plurality of spokes extending radially from said power shaft; and
   (e) a plurality of wind mill blades and a plurality of springs, each blade attached to a spoke by means of at least one spring, said springs biasing said blades in a first position facing typical air currents, said air currents rotating said power shaft about said vertical axis to align said power shaft parallel to the direction of the air currents, said springs permitting stronger air currents to move said blades toward a second position parallel to said air currents.

4. The generator of claim 3 wherein said generator further comprises a plurality of shock absorbers, having first and second ends, said first ends each communicating with a blade and said second ends each communicating with a spoke, said shock absorbers having a damping quality slowing the movement of said blades from said first position to said second position.

* * * * *

UNITED STATES PATENT AND TRADEMARK OFFICE
CERTIFICATE OF CORRECTION

PATENT NO. : 4,673,822

DATED : June 16, 1987

INVENTOR(S) : Naomi Kikuchi

It is certified that error appears in the above—identified patent and that said Letters Patent is hereby corrected as shown below:

Column 2, lines 67-68, "springs (1), subject to strong wind pressure" should read - -springs (1), so as not to be subject to strong wind pressure- -.

Column 4, line 41, "to said suport column" should read - -to said support column- -.

Signed and Sealed this

Twenty-seventh Day of October, 1987

Attest:

DONALD J. QUIGG

Attesting Officer

Commissioner of Patents and Trademarks